United States Patent
Jaradi et al.

(10) Patent No.: US 11,951,925 B1
(45) Date of Patent: Apr. 9, 2024

(54) VEHICLE AIRBAG SYSTEM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/932,680

(22) Filed: Sep. 16, 2022

(51) Int. Cl.
*B60R 21/0136* (2006.01)
*B60R 21/233* (2006.01)
*B60R 21/2338* (2011.01)

(52) U.S. Cl.
CPC ........ *B60R 21/0136* (2013.01); *B60R 21/233* (2013.01); *B60R 21/2338* (2013.01); *B60R 2021/23308* (2013.01); *B60R 2021/23382* (2013.01)

(58) Field of Classification Search
CPC .............. B60R 21/233; B60R 21/0136; B60R 2021/23308; B60R 2021/23161; B60R 2022/028; B60R 21/2338; B60R 2021/23382
See application file for complete search history.

(56) References Cited

U.S. PATENT DOCUMENTS

| | | | | |
|---|---|---|---|---|
| 5,104,727 A | * | 4/1992 | Wnenchak | B60R 21/235 442/268 |
| 5,609,363 A | * | 3/1997 | Finelli | B60R 21/2338 280/743.2 |
| 5,746,447 A | * | 5/1998 | Dyer | B60R 21/233 280/743.1 |
| 5,957,485 A | * | 9/1999 | Hirai | B60R 21/233 280/743.1 |
| 6,355,123 B1 | * | 3/2002 | Baker | B60R 21/2338 156/289 |
| 6,454,300 B1 | | 9/2002 | Dunkle et al. | |
| 6,581,961 B1 | * | 6/2003 | Bowers | B60R 21/33 280/735 |
| 6,767,030 B2 | * | 7/2004 | Yamaji | B60R 21/2171 280/740 |
| 7,163,234 B2 | * | 1/2007 | Hier | B60R 21/264 280/736 |

(Continued)

FOREIGN PATENT DOCUMENTS

| | | | | |
|---|---|---|---|---|
| FR | 2876334 A1 | * | 4/2006 | .......... B60R 21/233 |
| FR | 2931420 A1 | * | 11/2009 | .......... B60R 21/231 |
| WO | 2005120905 A2 | | 12/2005 | |

OTHER PUBLICATIONS

Cossais, Apr. 2006, FR-2876334-A1, Machine Translation of Specification.*

(Continued)

*Primary Examiner* — Paul N Dickson
*Assistant Examiner* — Matthew Joseph Ganci
(74) *Attorney, Agent, or Firm* — Frank A. MacKenzie; Bejin Bieneman PLC (57) ABSTRACT

A vehicle includes a bulkhead. The vehicle includes a base supported by the bulkhead and inflatable from a stowed position away from the bulkhead to a deployed position. The vehicle includes an airbag supported by the base and inflatable away from the bulkhead to a deployed position.

20 Claims, 6 Drawing Sheets

(56) References Cited

U.S. PATENT DOCUMENTS

| | | | |
|---|---|---|---|
| 9,205,795 B1* | 12/2015 | Cheng | B60R 21/205 |
| 9,487,177 B2 | 11/2016 | Schneider et al. | |
| 10,336,279 B2 | 7/2019 | Farooq et al. | |
| 10,596,992 B2* | 3/2020 | Choi | B60R 21/2338 |
| 10,882,487 B2 | 1/2021 | White et al. | |
| 11,345,305 B2 | 5/2022 | Fischer et al. | |
| 11,358,551 B1* | 6/2022 | Deng | B60R 21/205 |
| 2002/0158456 A1* | 10/2002 | Fischer | B60R 21/233 |
| | | | 280/743.2 |
| 2009/0200777 A1 | 8/2009 | Webber et al. | |
| 2015/0066308 A1* | 3/2015 | Nagasawa | B60R 21/01536 |
| | | | 701/45 |
| 2017/0282841 A1* | 10/2017 | Hayashi | B60R 21/239 |
| 2018/0361978 A1 | 12/2018 | Belwafa et al. | |
| 2020/0017058 A1* | 1/2020 | Jaradi | B60R 21/233 |
| 2020/0094770 A1 | 3/2020 | Fischer et al. | |
| 2020/0122675 A1* | 4/2020 | Perez | B60R 21/203 |
| 2020/0247350 A1* | 8/2020 | Hosoe | B60R 21/235 |
| 2020/0377052 A1* | 12/2020 | Youssef-Agha | B60R 21/231 |
| 2021/0023966 A1* | 1/2021 | Kanegae | B60R 21/0134 |
| 2022/0080917 A1 | 3/2022 | Sakurai | |
| 2022/0250576 A1* | 8/2022 | Farooq | B60R 21/2338 |
| 2022/0274554 A1* | 9/2022 | Jaradi | B60R 21/0136 |

OTHER PUBLICATIONS

Ledain, Nov. 2009, FR-2931420-A1, Machine Translation of Specification.*

Non-Final Office Action for U.S. Appl. No. 18/065,670, filed Dec. 14, 2022, as issued by the USPTO dated Jul. 10, 2023.

\* cited by examiner

VEHICLE AIRBAG SYSTEM

BACKGROUND

A vehicle may include one or more airbags deployable during certain vehicle impacts to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

A vehicle includes a bulkhead. The vehicle includes a base supported by the bulkhead and inflatable from a stowed position away from the bulkhead to a deployed position. The vehicle includes an airbag supported by the base and inflatable away from the bulkhead to an inflated position.

The base may include thermoplastic that defines an inflation chamber.

The airbag may include woven fabric that defines a second inflation chamber.

The vehicle may include a two-stage inflator in fluid communication with the inflation chamber and the second inflation chamber.

The base may include a class-A surface.

The vehicle may include a seat facing the bulkhead, the seat having a seatback, the seatback being reclinable, the airbag in the inflated position being in front of the seat.

The vehicle may include a second seat facing the bulkhead, the seat and the second seat arranged along a vehicle-lateral axis, the base extending along the bulkhead in front of the seat and the second seat.

The airbag in the inflated position may be in front of the seat and the second seat.

The airbag in the inflated position may include a first concave portion in front of the seat and a second concave portion in front of the second seat.

The vehicle may include a first tether internal of the airbag and providing the first concave portion and a second tether internal of the airbag and providing the second concave portion.

The seat may include a seat bottom having a top surface, and the airbag in the inflated position may extend below the top surface.

The vehicle may include a computer having a processor and a memory storing instructions executable by the processor to, in response to detecting that a recline angle of the seatback is greater than a threshold and detecting an impact to the vehicle, command the base to the deployed position and the airbag to the inflated position.

The instructions may include instructions command the airbag to the inflated position after commanding the base to the deployed position.

The instructions may include instructions to, in response to detecting that the recline angle of the seatback is not greater than the threshold and detecting the impact to the vehicle, command the base to a second deployed position and command the airbag to the inflated position.

The bulkhead may be at a front end of a passenger cabin of the vehicle.

The vehicle may include an inflator in fluid communication with the airbag and supported by the bulkhead, and wherein the base is between the inflator and the airbag.

The base may be between the inflator and the airbag along a vehicle-longitudinal axis.

The inflator may be a two-stage inflator and may also be in fluid communication the base.

With reference to the Figures, wherein like numerals indicate like parts throughout the several views, a vehicle 20 is shown. The vehicle 20 includes a bulkhead 22. The vehicle 20 includes a deployable base 24 supported by the bulkhead 22. The deployable base 24 is inflatable from a stowed position away from the bulkhead 22 to one or more deployed positions. The vehicle 20 includes an airbag 26 supported by the deployable base 24. The airbag 26 is inflatable away from the bulkhead 22 to a deployed position. Selective inflation of the deployable base 24, e.g., depending on a seatback angle α of a seat 28a, 28b of the vehicle 20, positions the airbag 26 relative to the seat 28a, 28b to control kinematics of an occupant of the seat 28a, 28b during certain impacts to the vehicle 20.

The vehicle 20 may be any suitable type of ground vehicle, e.g., a passenger or commercial automobile such as a sedan, a coupe, a truck, a sport utility, a crossover, a van, a minivan, a taxi, a bus, etc. The vehicle 20 defines a passenger compartment to house occupants, if any, of the vehicle 20. The passenger compartment may extend across the vehicle 20, i.e., from a right-side RS to a left-side LS of the vehicle 20. The passenger compartment includes a front end and a rear end with the front end being in front of the rear end during forward movement of the vehicle 20.

The vehicle 20 defines a lateral axis VA1 extending between the left-side LS and the right-side RS of the vehicle 20. The vehicle 20 defines a longitudinal axis VA2 extending between a front and a rear of the vehicle 20. The vehicle 20 defines a vertical axis A3 extending between a top and a bottom of the vehicle 20. The lateral axis VA1, the longitudinal axis VA2, and the vertical axis VA3 are perpendicular relative to each other.

In the example shown in the Figures, the vehicle 20 includes one bulkhead 22 at the front end of the passenger cabin. In another example, additionally or alternately, a bulkhead 22 may be at the rear end of the passenger cabin. In such an example, the bulkheads 22 may be identical or different. The bulkheads 22 are elongated along an axis BA of the bulkhead 22. The axis BA of the bulkhead 22 may extend along, i.e., be parallel to, the lateral axis VA1. In other words, the bulkheads 22 may be longer along the lateral axis VA1 that along the longitudinal axis VA2 or the vertical axis VA3. The bulkhead 22 may extend from a pillar on the right-side RS of the vehicle 20 to a pillar on a left-side LS of the vehicle 20. In other words, the bulkhead 22 may extend completely across the passenger cabin along the lateral axis VA. The bulkhead 22 may extend from a floor of the passenger cabin to a front windshield (or rear windshield), e.g., along the vertical axis VA3 of the vehicle 20. The bulkhead 22 may include an instrument panel. The instrument panel may include one or more instruments such as gauges, displays, a user interface, etc. The instrument panel may be elongated along the lateral axis VA from the left-side LS of the vehicle 20 to the right-side RS of the vehicle 20. The instrument panel presents information to and may receive information from an occupant of the vehicle 20. The instrument panel may include dials, digital readouts, screens such as a touch-sensitive display screen, speakers, buttons, knobs, keypads, microphone, and so on for providing information to, and receiving information from, the occupant. The instrument panel may support vehicle controls, including a steering wheel.

The vehicle 20 includes one or more seats 28a, 28b. Each seat 28a, 28b includes a seatback 32 and a seat bottom 34. The vehicle 20 may include any suitable number of seats 28a, 28b. The seats 28a, 28b may be arranged in the passenger cabin in any suitable position, i.e., as front seats 28a, 28b, rear seats, third-row seats, etc. The seats 28a, 28b may be movable relative to the floor to various positions, e.g., movable fore-and-aft and/or cross-vehicle. The seats 28a, 28b may be of any suitable type, e.g., a bucket seat. One or more of the seats 28a, 28b face the bulkhead 22. In other words, one or more of the seats 28a, 28b are positioned relative to the bulkhead 22 such that occupants face the bulkhead 22 when seated on top surfaces 36 of the seat bottoms 34 and with their backs against the seatbacks 32 of the seats 28a, 28b. For example, a first seat 28a and a second seat 28b may be positioned as front seats 28a, 28b arranged along the lateral axis VA1, e.g., with a center console therebetween.

The seatback 32 of the seat 28a, 28b is supported by the seat bottom 34 of the seat 28a, 28b. The seat 28a, 28b back is reclinable relative to the seat bottom 34 between an upright position, shown in FIG. 4, and a reclined position, shown in FIG. 5. The seatback 32 in the upright position is generally vertical, e.g., within 20 degrees of parallel to the vertical axis VA3. The seatback 32 in the reclined position is at a shallower angle than in the upright position. For example, the seatback 32 in the reclined position may be greater than 20 degrees from being parallel with the vertical axis VA3. The seatback 32 and the seat bottom 34 may be adjustable in multiple degrees of freedom. Specifically, the seatback 32 and the seat bottom 34 may themselves be adjustable, in other words, adjustable components within the seatback 32 and/or the seat bottom 34, and/or may be adjustable relative to each other.

The seatback 32 and the seat bottom 34 may each include a frame and a covering supported on the frame. Specifically, the frame of the seatback 32 may include a pair of upright frame members. The upright frame members are elongated, and specifically, are elongated in a generally upright direction when the seatback 32 is in a generally upright position. The upright frame members are spaced from each other, and the seatback frame includes cross-members extending between the upright frame members. The frame of the seat bottom 34 may include beams, pans, etc. The frames of the seat bottom 34 and the seatback 32 may be of any suitable plastic material, e.g., carbon fiber reinforced plastic CFRP, glass fiber-reinforced semi-finished thermoplastic composite organosheet, etc. As another example, some or all components of the frames may be formed of a suitable metal, e.g., steel, aluminum, etc. The covering may include upholstery and padding. The upholstery may be cloth, leather, faux leather, or any other suitable material. The upholstery may be stitched in panels around the frames. The padding may be between the coverings and the frames and may be foam or any other suitable material.

Figure 1:
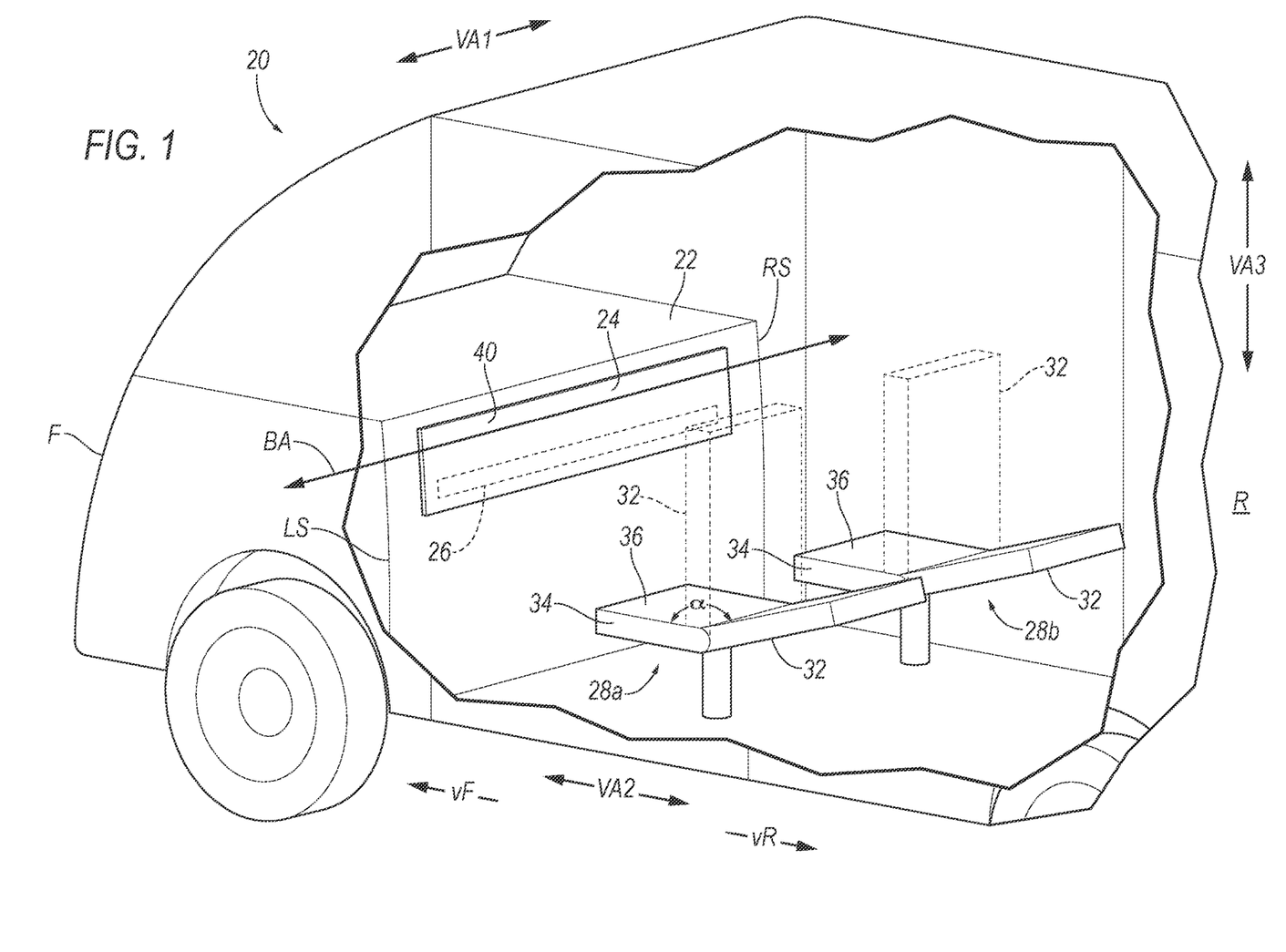
FIG. 1 is a perspective view of a portion of a vehicle while a break away to show a passenger cabin of the vehicle with a bulkhead and a deployable base.
Figure 3:
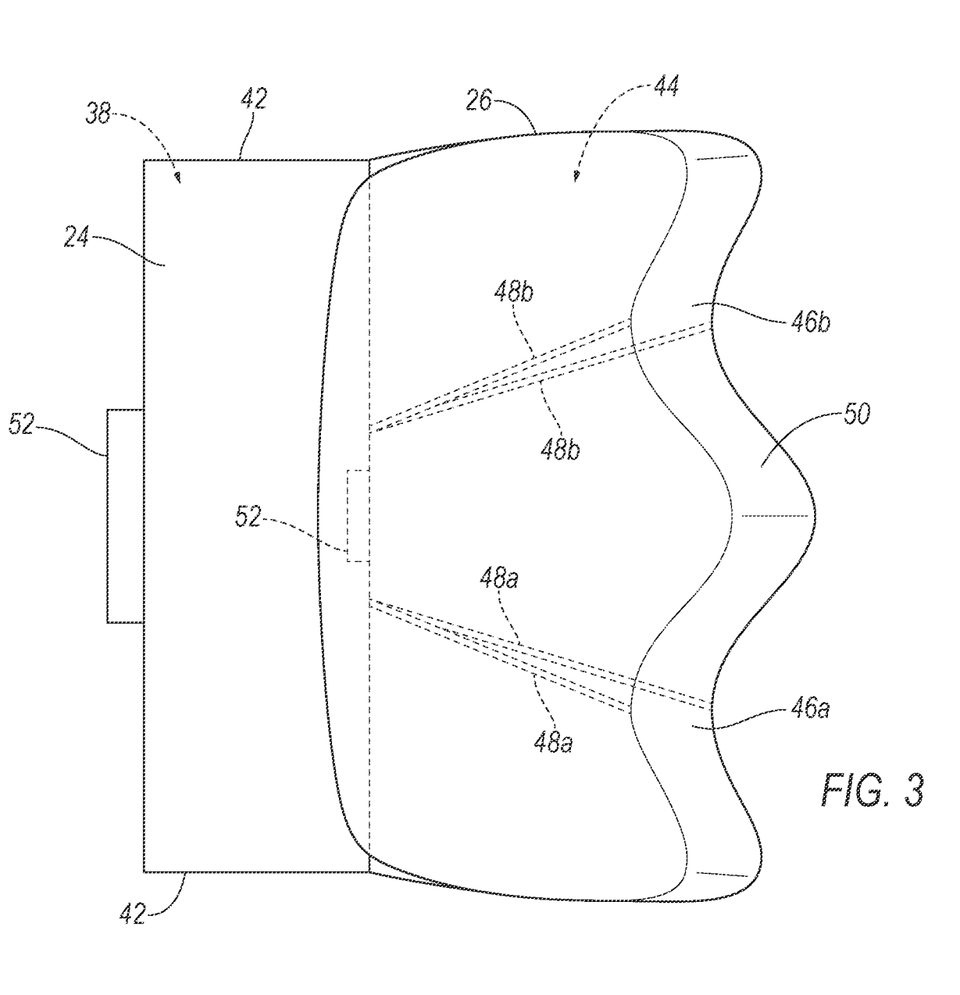
FIG. 3 is a top view of the deployable base in a first deployed position and the airbag in an inflated position.
Figure 4:
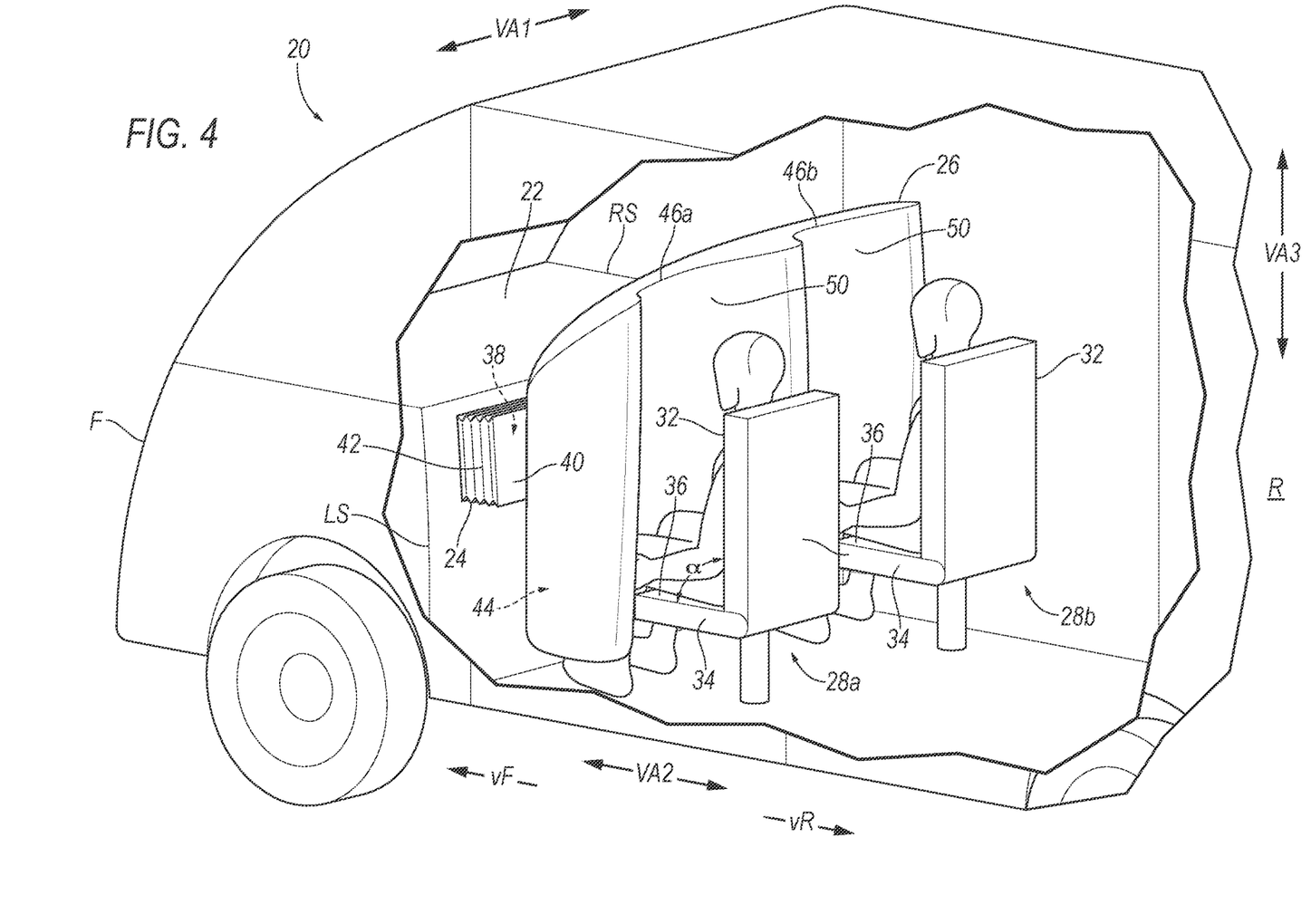
FIG. 4 is a perspective view of the passenger cabin of the vehicle with the deployable base at a second deployed position and the airbag in the inflated position.
Figure 5:
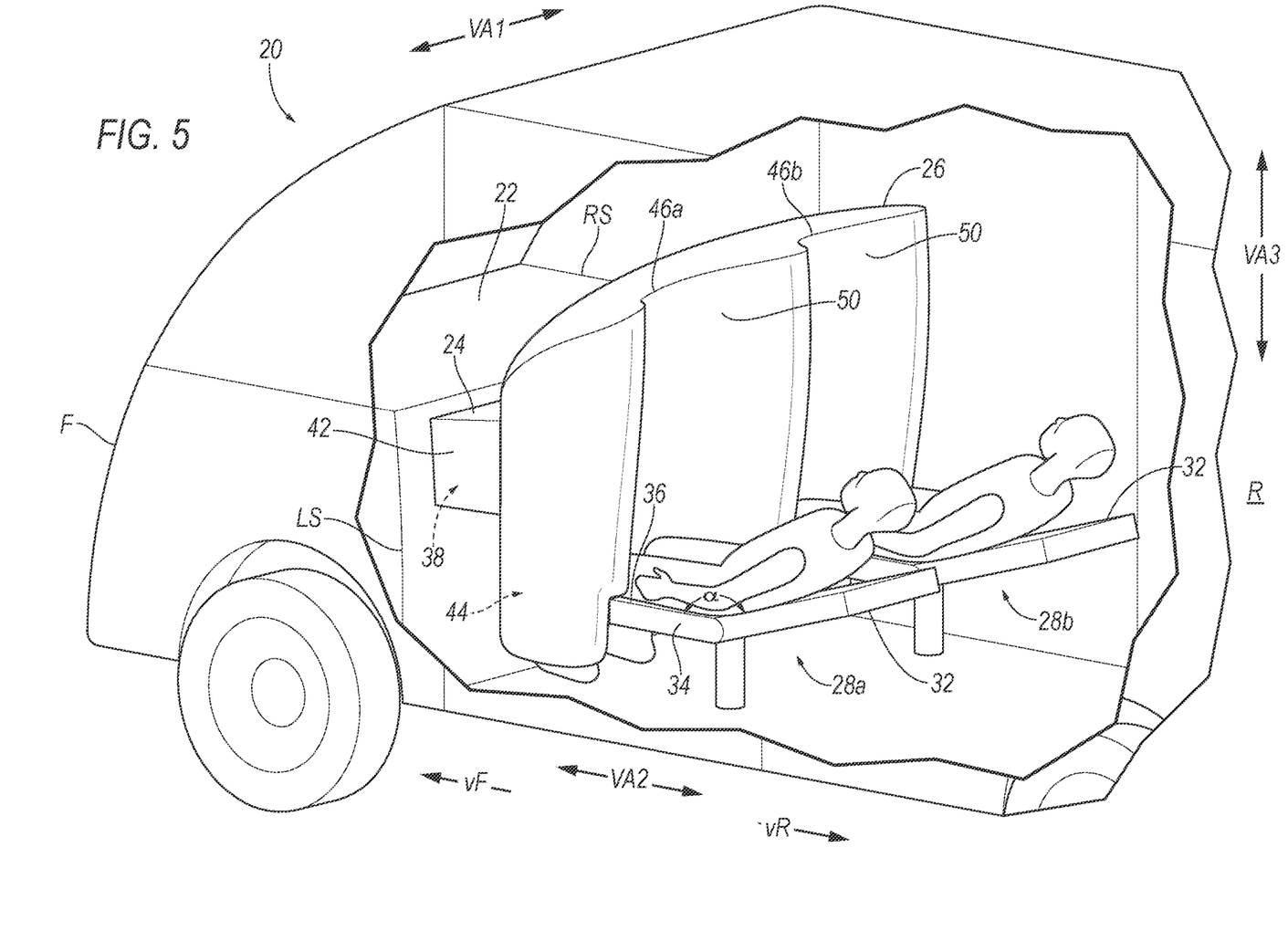
FIG. 5 is a perspective view of the passenger cabin of the vehicle with the deployable base at the first deployed position and the airbag in the inflated position.

The deployable base 24 is inflatable from the stowed position, shown in FIG. 1, away from the bulkhead 22 to one or more deployed positions, e.g., a first deployed position, shown in FIG. 5, and/or a second deployed position, shown in FIG. 4. Inflation of the deployable base 24, e.g., to the first deployed position or the second deployed position, may reposition the airbag 26 supported thereby relative to the seat 28a, 28b. The deployable base 24 at the first deployed position may extend from the bulkhead 22 further than at the second deployed position, e.g., along the longitudinal axis VA2. For example, the deployable base 24 at the first deployed position may position the airbag 26 closer to the seats 28a, 28b than at the second deployed position. The deployable base 24 is supported by the bulkhead 22. The deployable base 24 may be fixed to the bulkhead 22, e.g., with fasteners such as threaded fasteners, push-pins, Christmas-tree fasteners, adhesive, etc. The deployable base 24, e.g., in the stowed position and the deployed positions, may extend along the bulkhead 22 in front of the first seat 28a and the second seat 28b facing the bulkhead 22. In other words, the bulkhead 22 may be spaced from the first seat 28a and the second seat 28b along the longitudinal axis VA2 and overlap the first seat 28a and the second seat 28b along the lateral axis VAL With reference to FIGS. 2-5, the deployable base 24 defines a first inflation chamber 38 that receives inflation medium to inflate the deployable base 24 to the first or the second deployed position. For example, the deployable base 24 may include a main panel 40 and sidewalls 42 that enclose the first inflation chamber 38. The sidewalls 42 may extend from the main panel 40 toward the bulkhead 22. The sidewalls 42 may be folded, e.g., in an accordion fold pattern, when the deployable base 24 is at the stowed position. The sidewalls 42 may partially or fully unfold when the deployable base 24 is inflated to the first deployed position or the second deployed position. The sidewalls 42 of the deployable base 24 are solid, i.e., not woven, not fabric, etc. The main panel 40 and the sidewalls 42 may be unitary. In other words, the main panel 40 and the sidewalls 42 in combination are a single, uniform piece of material with no seams, joints, fasteners, or adhesives holding them to each other, i.e., are formed together simultaneously as a single continuous unit. As another example, the main panel 40 and the sidewalls 42 may be non-unitary, i.e., formed separately and subsequently assembled, e.g., by adhesive, welding, overmolding, etc. The deployable base 24 may be formed using any suitable manufacturing process, e.g., injection molding, blow molding, ultrasonic welding, etc. The deployable base 24 may be include a class-A surface, e.g., the main panel 40 may be textured in the molding process to match another class-A surface in the vehicle 20. In other words, the main panel 40 can be integrated into vehicle components without an additional covering. In another example, the deployable base 24 may include a covering supported by the main panel 40, the covering providing class-A surface that is exposed to view by a customer and free of unaesthetic blemishes and defects.

The deployable base 24 may include a thermoplastic elastomer that aids in deployment characteristics such as controlling shape and size characteristics of the deployable base 24 in the deployed positions and may aid in packaging of the deployable base 24. For example, the sidewalls 42, the main panel 40, and/or other components defining the first inflation chamber 38 may be thermoplastic elastomers. Thermoplastic elastomers have both thermoplastic and elastomeric properties. Example thermoplastic elastomers include styrenic block copolymers, thermoplastic olefins, elastomeric alloys, thermoplastic polyurethanes, thermoplastic copolyesters, and thermoplastic polyamides. The deployable base 24, e.g., the main panel 40 and/or the sidewalls 42, may each have a thickness of 1-3 mm, e.g., between respective inner and outer facing surfaces.

Figure 2:
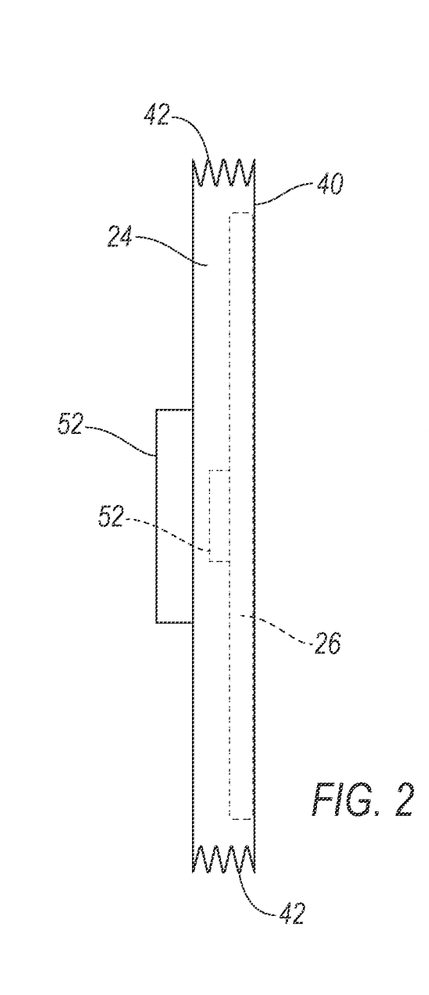
FIG. 2 is a top view of the deployable base in a stowed position and an airbag in an uninflated position.

The airbag 26 is inflatable from an uninflated position, shown in FIGS. 1 and 2, away from the bulkhead 22 to the inflated position, shown in FIGS. 3-5. The airbag 26 in the inflated position may control kinematics of one or more occupants of the vehicle 20, e.g., during certain impacts to the vehicle 20. The airbag 26 defines a second inflation chamber 44 that receives inflation medium to inflate the airbag 26 to the inflated position. For example, one or more woven fabric panels of the airbag 26 may enclose the second inflation chamber 44. The airbag 26 may be woven fabric, e.g., a woven polymer. As an example, the airbag 26 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

The airbag 26 may be supported by the deployable base 24. For example, the airbag 26 may be fixed to the main panel 40 of the deployable base 24, e.g., via a housing, bracket, fastener, etc. The airbag 26 housing houses the airbag 26 in an uninflated position and supports the airbag 26 in an inflated position. The airbag 26 may be rolled and/or folded to fit within the housing in the uninflated position. The housing may be, e.g., a fabric, a polymer, a metal, a composite, or any combination of suitable materials. The airbag 26 may be supported in the first inflation chamber 38 of the deployable base 24, e.g., by the main panel 40 opposite the class-A surface. The deployable base 24, e.g., the main panel 40, may include tear seams, doors, or other structure to permit inflation of the airbag 26. The deployable base 24 may provide a reaction surface of the airbag 26 in the inflated position.

The airbag 26 in the inflated position may be in front of the first seat 28a and/or the second seat 28b, e.g., to control kinematics of an occupant of the first seat 28a and/or an occupant of the second seat 28b during certain impacts to the vehicle 20. In other words, the airbag 26 in the inflated position may be spaced from the first seat 28a and the second seat 28b along the longitudinal axis VA2 and overlap the first seat 28a and/or the second seat 28b along the lateral axis VA1. The airbag 26 in the inflated position may be between the base and the first seat 28a and/or the second seat 28b along the longitudinal axis VA2.

The airbag 26 in the inflated position may include a first concave portion 46a in front of the first seat 28a and/or a second concave portion 46b in front of the second seat 28b. The concave portions 46a, 46b may receive the occupants during certain impacts to the vehicle 20 and control kinematics of the occupant along the longitudinal axis VA2 and the lateral axis VAL The concave portions 46a, 46b may curve toward the bulkhead 22 and away from the first seat 28a and the second seat 28b. The concave portions 46a, 46b may be sized to receive a head of an opponent of the seat 28a, 28b, e.g., the head of a standard sized crash test dummy (such as a 50th Percentile Adult Male Hybrid III crash test dummy).

One or more tethers 48a, 48b may be included internal of the airbag, e.g., to control a shape of the airbag in the inflated position. A first tether 48a may be internal of the airbag 26 and provide the first concave portion 46a. A second tether 48b may be internal of the airbag 26 and provide the second concave portion 46b. For example, an end of the first tether 48a may be fixed to an impact panel 50 of the airbag 26 at a position centered relative to the first seat 28a along the lateral axis VA1, and an end the second tether 48b may be fixed to the impact panel 50 of the airbag 26 at a position centered relative to the second seat 28b along the lateral axis VA1. Opposite ends of the first tether 48a and the second tether 48b may be fixed to the airbag 26 a position spaced from the impact panel 50 along the longitudinal axis VA2, to the main panel 40 of the deployable housing, to the housing of the airbag 26, or to any suitable structure. The airbag 26 in the inflated position may extend below the top surface 36 of the seat bottom 34, e.g., along the vertical axis VA3. The airbag 26 extending below the top surface 36 of the seat bottom 34 may control kinematics of legs of an occupant of the seat 28a, 28b.

One or more inflators 52 may be in fluid communication with the first inflation chamber 38 of the deployable base 24 and the second inflation chamber 44 of the airbag 26, e.g., via tubing or any suitable structure for directing inflation medium to the inflation chamber and/or the second inflation chamber 44. The inflator(s) 52 inflate the deployable base 24 and/or the airbag 26 with inflation medium, such as a gas, to inflate the deployable base 24 to the first deployed position or the second deployed position and/or the airbag 26 to the inflated position. The inflator(s) 52 may be, for example, a pyrotechnic inflator that ignites a chemical reaction to generate the inflation medium, a stored gas inflator that releases e.g., by a pyrotechnic valve stored gas as the inflation medium, or a hybrid. The inflator 52 may be a multiple stage inflator in which the inflation medium is provided at different stages that are physically separate from each other and/or may be activated separate from each other. For example, the inflator 52 may be a two-stage inflator in fluid communication with the first inflation chamber 38 and the second inflation chamber 44. In other words, the inflator 52 may include a first stage that is operatively coupled to the deployable base 24 to provide inflation medium to the first inflation chamber 38, and the inflator 52 may include a second stage that is operatively coupled to the airbag 26 to provide inflation medium to the second inflation chamber 44, e.g., via tubing or the like. As another example, the inflator 52 may be a two-stage inflator with both stages in fluid communication with the first inflation chamber 38. In such example, inflation medium provided by one of the stages may inflate the deployable base 24 to the second deployed position, and inflation medium provided by the other stage (or both of the stages) may inflate the deployable base 24 to the first deployed position.

The inflator(s) 52 may be supported by any suitable component(s). For example, the inflator(s) 52 may be supported by the bulkhead 22, e.g., fixed thereto via fastener or the like. The deployable base 24 may be between the inflator 52 and the airbag 26, e.g., along the longitudinal axis VA2. The inflator 52 may be vehicle-forward VF of the deployable base 24 and the airbag 26 may be vehicle-rearward VR of the deployable base 24. The inflator(s) 52 may be, for example, at least partially in the first inflation chamber 38 to deliver inflation medium directly to the first inflation chamber 38 or may be connected to the first inflation chamber 38 through fill tubes, diffusers, etc. The inflator(s) 52 may be, for example, at least partially in the second inflation chamber 44 to deliver inflation medium directly to the second inflation chamber 44 or may be connected to the second inflation chamber 44 through fill tubes, diffusers, etc.

Figure 6:
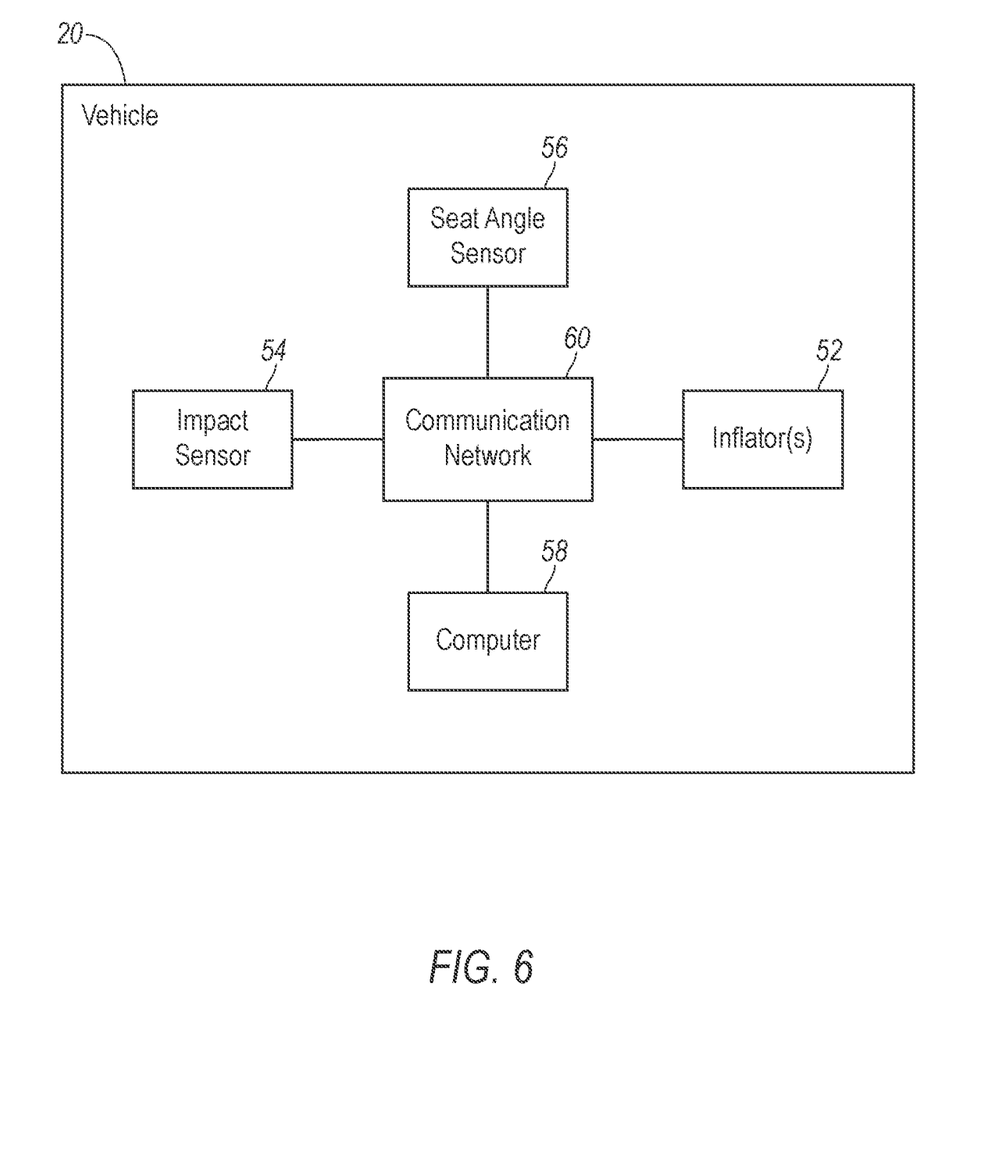
FIG. 6 is a block diagram of components of the vehicle.

With reference to FIG. 6, the vehicle 20 can include an impact sensor 54 that is configured to detect an impact to the vehicle 20. The impact sensor 54 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 54 may be located at numerous points in or on the vehicle 20.

The vehicle 20 may include an angle sensor 56 configured to detect the seatback angle α between the seat bottom 34 and the seatback 32. The angle sensor 56 may be, for example, a proximity sensor, a touch sensor, a hall effect sensor, a rotary encoder, a camera, a switch, or any other suitable sensor that can generate a signal indicate the angle between the seat bottom 34 and the seatback 32. The angle sensor 56 can be supported by the seat bottom 34, the seatback 32, or any suitable structure. The angle sensor 56 may be in communication with the computer 58. In other words, the computer 58 may receive a signal from the angle sensor 56 indicating angle between the seat bottom 34 and the seatback 32.

The vehicle 20 may include a computer 58 to control inflation of the deployable base 24 and the airbag 26. The computer 58 is generally arranged for communications on a communication network 60 that can include a bus in the vehicle 20 such as a controller area network (CAN) or the like, and/or other wired and/or wireless mechanisms. Via the communication network 60, the computer 58 may transmit messages to various devices in the vehicle 20, and/or receive messages (e.g., CAN messages) from the various devices, e.g., the inflator 52, the impact sensor 54, the angle sensor 56, etc. Alternatively or additionally, in cases where the computer 58 comprises a plurality of devices, the communication network 60 may be used for communications between devices represented as the computer 58 in this disclosure.

The computer 58 includes a processor and a memory. The memory includes one or more forms of computer 58 readable media, and stores instructions executable by the processor for performing various operations, processes, and methods, as disclosed herein. For example, the computer 58 can be a generic computer 58 with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 58 may be a restraints control module. In another example, computer 58 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured deployable base 24*d* on VHDL programming provided pre-manufacturing, whereas logical components inside an FPGA may be configured deployable base 24*d* on VHDL programming, e.g., stored in a memory electrically connected to the FPGA circuit. In some examples, a combination of processor(s), ASIC(s), and/or FPGA circuits may be included in the computer 58. The memory can be of any type, e.g., hard disk drives, solid state drives, servers, or any volatile or non-volatile media. The memory can store the collected data sent from the sensors.

Figure 7:
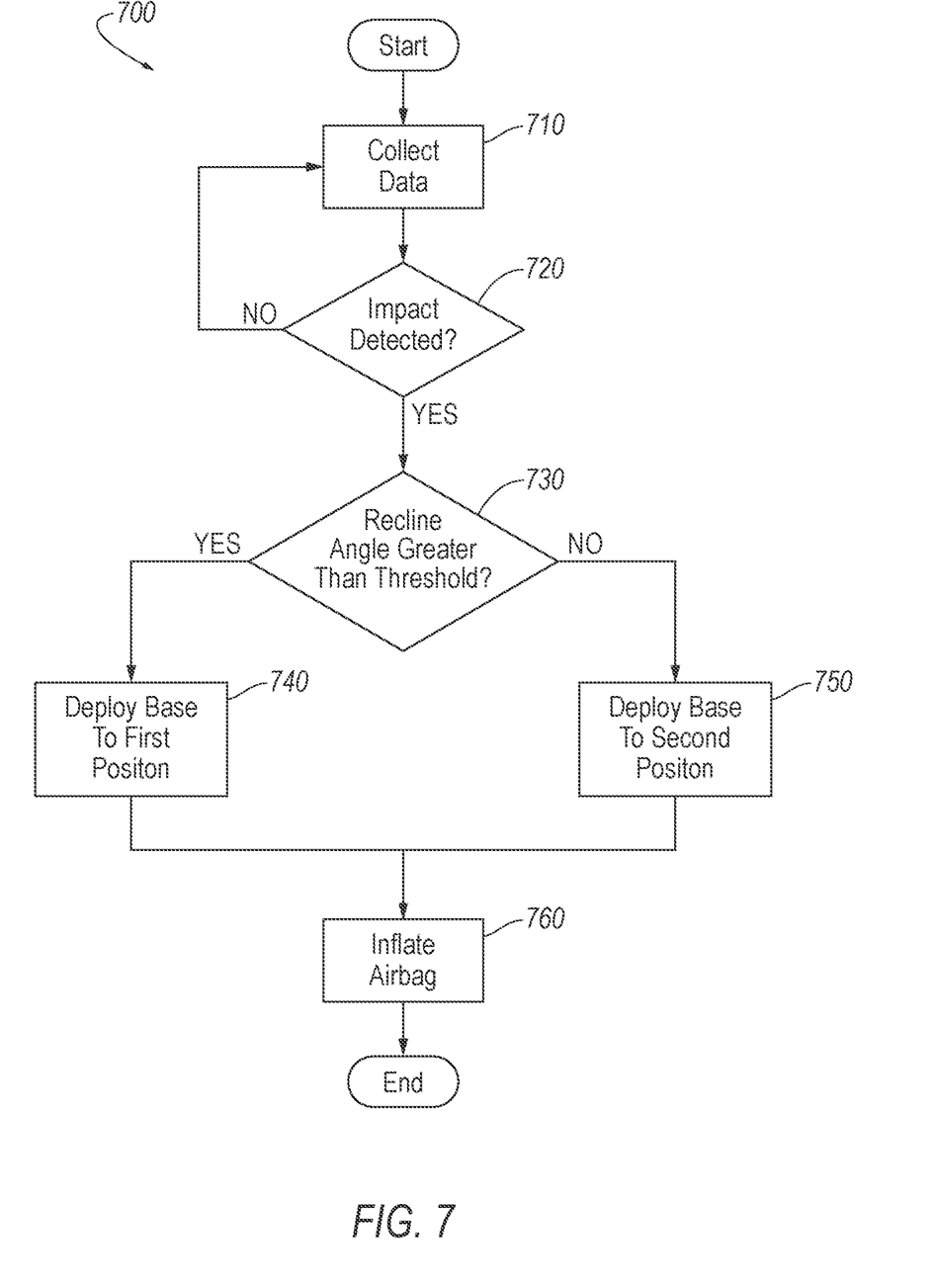
FIG. 7 is a flow chart illustrating a process for controlling inflation of the deployable base and the airbag.

FIG. 7 is a process flow diagram illustrating an exemplary process Z00 for controlling the deployable base 24 and the airbag 26. The process S00 may be performed by the computer 58. In other words, the memory of the computer 58 may store instructions executable by the process to perform the method. The process 700 begins in a block 710, in which the computer 58 collects data, e.g., received from the angle sensor 56, the impact sensor 54, etc., e.g., via the communication network 60. The computer 58 may continue to receive data throughout the process 700. Throughout the process 700 in the present context means substantially continuously or at time intervals, e.g., every 100 milliseconds. The computer 58 may store such data.

Next, at a block 720 the computer 58 determines whether an impact to the vehicle 20 is detected. The computer 58 may detect the impact based on information received from the impact sensor 54*s* via the communication network 60. In response to detecting the impact to the vehicle 20 the computer 58 moves to a block 730. Else, the computer 58 may return to the block 710.

At the block 730 the computer 58 determines whether a recline angle of the seatback 32 is greater than a threshold, e.g., an angle of 110 degrees. The computer 58 may detect the recline angle of the seatback 32 based on information from the angle sensor 56, and compare the detected angle indicated in the information from the angle sensor 56 with the threshold. The threshold may be predetermined and stored in memory of the computer 58. The threshold may be empirically predetermined, e.g., with actual and/or simulation based empirical testing utilizing crash test dummies seated at various recline angles and the deployable base 24*d* at various positions. The threshold may generally define a boundary between "upright" seating positions and "reclined" seating positions. In response to determining the recline angle is greater than the threshold the computer 58 moves to a block 740. In response to determining the recline angle is not greater than the threshold the computer 58 moves to a block 750.

At the block 740 the computer 58 inflates the deployable base 24 to the first position. For example, the computer 58 may provide impulses to pyrotechnic charges of both the first stage and the second stage of the inflator 52 in fluid communication with the deployable base 24. After the block 740 the computer 58 moves to a block 760.

At the block 750 the computer 58 inflates the deployable base 24 to the second position. For example, the computer 58 may provide and impulse just to the pyrotechnic charge of a first stage of the inflator 52 in fluid communication with the deployable base 24 and not the pyrotechnic charge of a second stage. After the block 750 the computer 58 moves to the block 760.

At the block 760 the computer 58 inflates the airbag 26. For example, the computer 58 may provide a pulse to the pyrotechnic material of the stage of the inflator 52 in fluid communication with the airbag 26. The airbag 26 in the inflated position may control kinematics of one or more occupants of the vehicle 20. After the block 760, the process 700 may end.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives "first" and "second" are used throughout this document as identifiers and do not signify importance, order, or quantity.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer 58. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
   a bulkhead;
   a seat facing the bulkhead, the seat having a seatback, the seatback being reclinable;
   a base supported by the bulkhead and inflatable from a stowed position away from the bulkhead to a deployed position;
   an airbag supported by the base and inflatable away from the bulkhead to an inflated position, the airbag in the inflated position being in front of the seat; and
   a computer having a processor and a memory storing instructions executable by the processor to, in response to detecting that a recline angle of the seatback is greater than a threshold and detecting an impact to the vehicle, command the base to the deployed position and the airbag to the inflated position.

2. The vehicle of claim 1, wherein the base includes a main panel and side walls that define an inflation chamber, the main panel and the side walls being thermoplastic elastomers.

3. The vehicle of claim 2, wherein the airbag includes woven fabric that defines a second inflation chamber.

4. The vehicle of claim 3, further comprising a two-stage inflator in fluid communication with the inflation chamber and the second inflation chamber.

5. The vehicle of claim 1, wherein the base includes a class-A surface.

6. The vehicle of claim 1, further comprising a second seat facing the bulkhead, the seat and the second seat arranged along a vehicle-lateral axis, the base extending along the bulkhead directly in front of the seat and the second seat.

7. The vehicle of claim 6, wherein the airbag in the inflated position is directly in front of the seat and the second seat.

8. The vehicle of claim 7, wherein the airbag in the inflated position includes a first concave portion directly in front of the seat and a second concave portion directly in front of the second seat.

9. The vehicle of claim 8, further comprising a first tether internal of the airbag and providing the first concave portion and a second tether internal of the airbag and providing the second concave portion.

10. The vehicle of claim 6, wherein the seat includes a seat bottom having a top surface, and wherein the airbag in the inflated position extends below the top surface.

11. The vehicle of claim 1, wherein the instructions include instructions to command the airbag to the inflated position after commanding the base to the deployed position.

12. The vehicle of claim 1, wherein the instructions include instructions to, in response to detecting that the recline angle of the seatback is not greater than the threshold and detecting the impact to the vehicle, command the base to a second deployed position and command the airbag to the inflated position.

13. The vehicle of claim 1, wherein the bulkhead is at a front end of a passenger cabin of the vehicle.

14. The vehicle of claim 1, further comprising an inflator in fluid communication with the airbag and supported by the bulkhead, and wherein the base is between the inflator and the airbag.

15. The vehicle of claim 14, wherein the base is between the inflator and the airbag along a vehicle-longitudinal axis.

16. The vehicle of claim 14, wherein the inflator is a two-stage inflator and is also in fluid communication the base.

17. The vehicle of claim 2, wherein the main panel is 1-3 millimeters thick.

18. The vehicle of claim 2, wherein the main panel includes a class-A surface and the airbag is supported in the inflation chamber opposite the class-A surface.

19. A vehicle, comprising:
   a bulkhead;
   a seat facing the bulkhead, the seat having a seatback, the seatback being reclinable;
   a second seat facing the bulkhead, the seat and the second seat arranged along a vehicle-lateral axis;
   a base supported by the bulkhead and inflatable from a stowed position away from the bulkhead to a deployed position, the base extending along the bulkhead directly in front of the seat and the second seat; and
   an airbag supported by the base and inflatable away from the bulkhead to an inflated position, the airbag in the inflated position being directly in front of the seat.

20. A vehicle, comprising:
    a bulkhead;

a base supported by the bulkhead and inflatable from a stowed position away from the bulkhead to a deployed position, the base including a class-A surface; and an airbag supported by the base and inflatable away from the bulkhead to an inflated position.

* * * * *